(12) United States Patent
Choi et al.

(10) Patent No.: US 11,440,780 B2
(45) Date of Patent: Sep. 13, 2022

(54) CONTROL SYSTEM FOR LOWERING FORKLIFT LEVER

(71) Applicant: DOOSAN CORPORATION, Seoul (KR)

(72) Inventors: Jaesung Choi, Seoul (KR); Jinyong Lee, Incheon (KR); Dongho Han, Seoul (KR); Beomkyun Yu, Gyeonggi-do (KR)

(73) Assignee: DOOSAN INDUSTRIAL VEHICLE CO., LTD., Incheon (KR)

( * ) Notice: Subject to any disclaimer, the term of this patent is extended or adjusted under 35 U.S.C. 154(b) by 306 days.

(21) Appl. No.: 16/719,750

(22) Filed: Dec. 18, 2019

(65) Prior Publication Data

US 2020/0198948 A1 Jun. 25, 2020

(30) Foreign Application Priority Data

Dec. 20, 2018 (KR) .................. 10-2018-0166139

(51) Int. Cl.
*B66F 9/07* (2006.01)
*B66F 9/075* (2006.01)
*B60W 10/30* (2006.01)
*F15B 11/05* (2006.01)

(52) U.S. Cl.
CPC .......... *B66F 9/0755* (2013.01); *B60W 10/30* (2013.01); *F15B 11/05* (2013.01); *B60W 2300/121* (2013.01)

(58) Field of Classification Search
CPC ................ B66F 9/0755; B60W 10/30; B60W 2300/121; F15B 11/05
See application file for complete search history.

(56) References Cited

U.S. PATENT DOCUMENTS

| 4,182,126 A | 1/1980 | Blakeslee | |
|---|---|---|---|
| 2015/0100210 A1* | 4/2015 | Hoock | B66F 9/10 701/50 |
| 2019/0270629 A1* | 9/2019 | Kimura | B66F 9/24 |

FOREIGN PATENT DOCUMENTS

| EP | 2101065 A1 | 9/2009 |
|---|---|---|
| JP | 2000355497 A | 12/2000 |
| JP | 2009249070 A | 10/2009 |
| JP | 2011046499 A | 3/2011 |
| WO | 2017216935 A1 | 12/2017 |

OTHER PUBLICATIONS

Search Report issued in corresponding European Patent Application No. 19218387.9 dated Jun. 8, 2020, consisting of 9 pp.

* cited by examiner

*Primary Examiner* — Tyler J Lee
*Assistant Examiner* — Yufeng Zhang
(74) *Attorney, Agent, or Firm* — Volpe Koenig

(57) ABSTRACT

A system of controlling a lowering speed of a work lever of a forklift which includes, a hydraulic motor connected to the work lever through a hydraulic line to transmit a power to the work lever; an electronic solenoid valve for controlling the hydraulic motor connected to the work lever; a weight sensor provided at one side of the work lever, the weight sensor measuring a weight of a load placed on the work lever and transmitting the measured value to a controller; and a controller for controlling an RPM of the hydraulic motor and a current amount of the electronic solenoid valve based on the measured value transmitted from the weight sensor.

4 Claims, 5 Drawing Sheets

CONTROL SYSTEM FOR LOWERING FORKLIFT LEVER

CROSS-REFERENCE TO RELATED APPLICATION

This application claims priority to and the benefit of Korean Patent Application No. 10-2018-0166139, filed on Dec. 20, 2018, in the Korean Intellectual Property Office (KIPO), the disclosure of which is incorporated by reference herein in its entirety.

1. Technical Field

Aspects of embodiments relate to a system of controlling a lowering speed, and more particularly, to a system of controlling a speed of lowering a forklift lever which may lower the work lever of the forklift at a constant lowering speed, irrespective of a weight of a load.

2. Discussion of Related Art

A forklift is a machine that transports loads using a hydraulic system. In such a case, due to the characteristics of the hydraulic system, a lifting or lowering speed of a work lever, which supports loads, inevitably varies depending on the weight of the load. In particular, since the speed of lowering the work lever is proportional to a pressure of a hydraulic cylinder connected to the work lever, the lowering speed is low when there is no load, and the lowering speed is high when there is a load. Control over the lowering speed is essential since it is directly related to safety.

In order to limit a maximum speed of this lowering speed, conventional forklifts should be equipped with a flow regulator. However, although the maximum speed could be adjusted through the use of a flow regulator (e.g., a flow check valve), there still was a problem that an amount of change in the lowering speed of the lever, with respect to a valve opening area, varies depending on the load or no-load condition.

FIG. 1A is an illustration of a conventional forklift 10 having a work lever 11 that is conventionally operated with an operation device such as a lift knob of a forklift control. FIG. 1B is a graph illustrating a lowering speed of the work lever 11 of the conventional forklift 10 that may be equipped with a flow regulator.

Meanwhile, in a hydraulic cylinder connected to a work lever, a flow rate Q is expressed as a product of a constant C, an area A, and a pressure P, that is, Q=C×A×P. Accordingly, respective pressures in the load and no-load conditions are different from each other, inevitably resulting in a difference in an amount of change (e.g., a rate of change) in the lowering speed of the lever.

The flow regulator merely controls the maximum speed, and since the time for reaching the maximum speed of the work lever varies depending on the weight of the load, the controllability and operability of the forklift are bound to be degraded.

Further, due to such conventional constraints that it is difficult to control an amount of change in the speed of the lever, there is a problem that the operability is degraded, or the overall stability of the forklift is lowered. In particular, a sudden change in the lowering speed of the work lever of the forklift involves shocks or vibrations in the entire forklift system, thus degrading the stability of the load and causing inconvenience to workers who should try to operate the work lever differently depending on the weight of the load.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Embodiments may be directed to a system of controlling a lowering speed of a work lever of a forklift which may realize a constant amount of change in the lowering speed with respect to a valve opening area, irrespective of a weight of a load placed on the work lever, although a flow regulator is not provided.

According to an embodiment, a system of controlling a lowering speed of a work lever of a forklift includes, a hydraulic motor connected to the work lever through a hydraulic line to transmit a power to the work lever; an electronic solenoid valve for controlling the hydraulic motor connected to the work lever; a weight sensor provided at one side of the work lever, the weight sensor measuring a weight of a load placed on the work lever and transmitting the measured value to a controller; and a controller for controlling an RPM of the hydraulic motor and a current amount of the electronic solenoid valve based on the measured value transmitted from the weight sensor. A constant amount of change in a lowering speed of the work lever with respect to a valve opening area is implemented, irrespective of the weight of the load placed on the work lever.

According to an embodiment, the weight sensor may measure the weight of the load placed on the work lever, convert the weight into a load voltage, and transmit the load voltage to the controller.

According to an embodiment, a table may be preset in the controller, the table including a maximum current under a full load condition of the load placed on the work lever and a maximum current under a no-load condition, and the controller may determine a maximum load current of the electronic solenoid valve, between the maximum current under the full load condition and the maximum current under the no-load condition, according to the weight of the load measured by the weight sensor.

According to an embodiment, the controller may determine the maximum load current of the electronic solenoid valve based on the load voltage and the following Equation 1.

$$H = \frac{(B-C)}{(E-D)} \times (G-D) + C \quad \text{[Equation 1]}$$

B: Maximum current under full load condition
C: Maximum current under no-load condition
D: Minimum weight voltage
E: Maximum weight voltage
G: Load voltage
H: Maximum load current According to an embodiment, a table according to a height of a work lever may be preset in the controller, and the controller may determine a valve current applied to the electronic solenoid valve, based on the determined maximum load current.

According to an embodiment, the controller may determine the valve current based on the following Equation 2.

$$I = A + \frac{F}{1000} \times (H - A) \quad \text{[Equation 2]}$$

A: Minimum valve current
F: Height of the work lever
I: Valve Current
D: Minimum weight voltage
H: Maximum load current The foregoing is illustrative only and is not intended to be in any way limiting. In addition to the illustrative aspects, embodiments and features described above, in addition aspects, embodiments and features will become apparent by reference to the drawings and the following detailed description.

BRIEF DESCRIPTION OF THE DRAWINGS

A more complete appreciation of the present disclosure will become more apparent by describing in detail embodiments thereof with reference to the accompanying drawings, wherein.

DETAILED DESCRIPTION

Figure 1B:
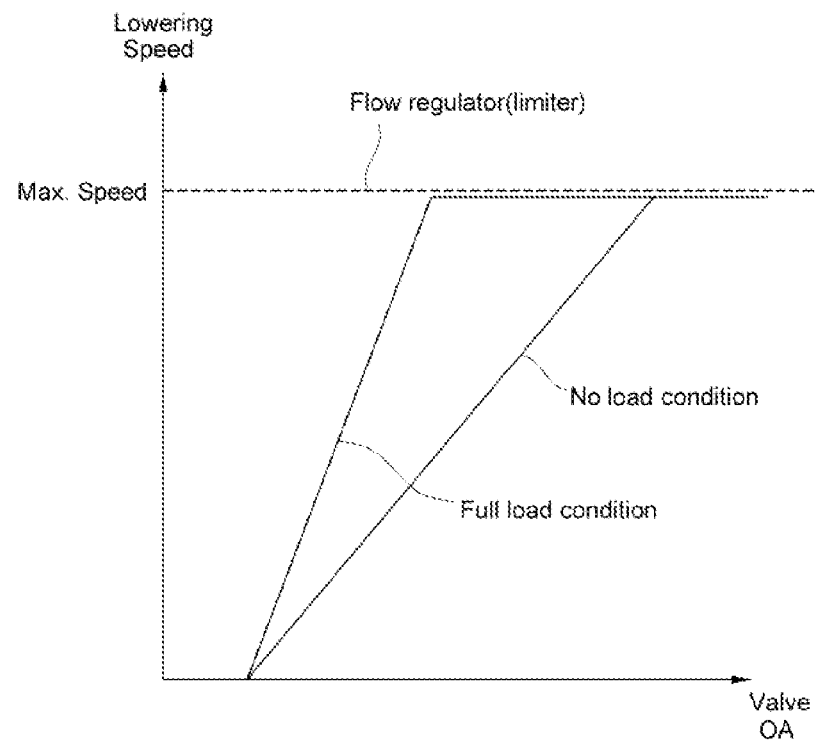
FIG. 1A is an illustration of a conventional forklift and FIG. 1B is a graph illustrating a lowering speed of a lever of the conventional forklift of FIG. 1A that may be equipped with a flow regulator.
Figure 1A:
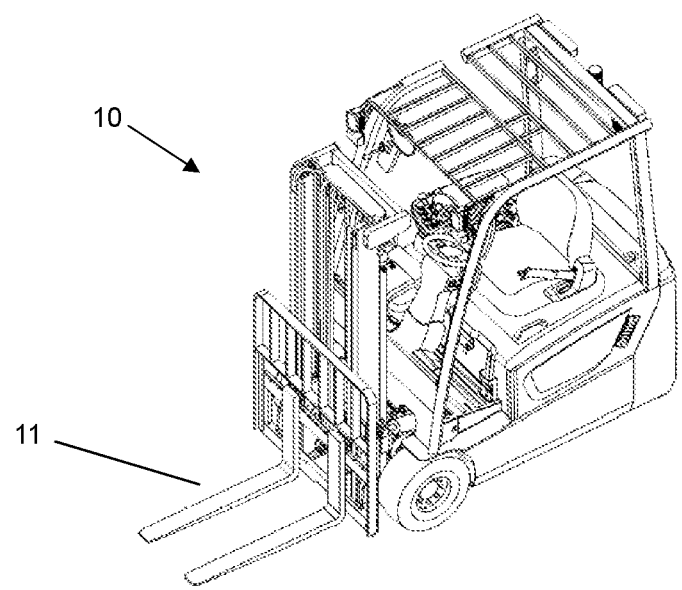

Embodiments will now be described more fully hereinafter with reference to the accompanying drawings. Although the invention may be modified in various manners and have several embodiments, embodiments are illustrated in the accompanying drawings and will be mainly described in the specification. However, the scope of the present invention is not limited to the embodiments and should be construed as including all the changes, equivalents and substitutions included in the spirit and scope of the present invention. These embodiments are provided to more completely explain the present invention to those skilled in the art. It is noted that the figures are schematic and not drawn to scale. The relative dimensions and ratios of the parts in the figures are exaggerated or reduced in size for clarity and convenience and any dimensions are merely exemplary and not limiting. Throughout the description herein, unless otherwise specified, the same or similar reference numeral in different figures refer to the same or similar element formed by a same or similar formation method using a same or similar material(s). In addition, detailed descriptions of well-known functions and configurations that are determined to unnecessarily obscure the subject matter of the present disclosure will be omitted.

The present disclosure is configured so that a constant amount of change in a lowering speed of a work lever 11, with respect to a valve opening area, is realized, irrespective of a weight of a load placed on the work lever 11, through the use of a weight sensor 140 without using a separate expensive regulator (e.g., a check valve), thereby increasing the controllability and stability of the forklift operation.

Figure 2:
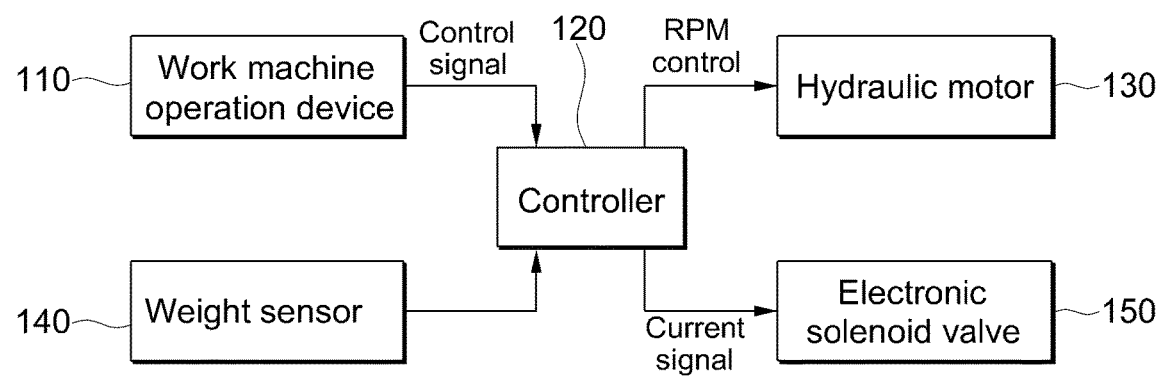
FIG. 2 is a block diagram illustrating a system of controlling a lowering speed of a forklift lever according to an embodiment of the present disclosure.

FIG. 2 is a block diagram illustrating a system of controlling a lowering speed of the forklift lever 11 according to an embodiment of the present disclosure.

In detail, as illustrated in FIG. 2, a system of controlling a lowering speed of a work lever 11 of a forklift 10 includes a work machine operation device 110; a controller 120 for controlling an RPM of a hydraulic motor 130 and a current amount of an electronic solenoid valve 150; the hydraulic motor 130 connected to the work lever 11 through a hydraulic line to transmit a power to the work lever 11; a weight sensor 140 provided at one side of the work lever 11 of the forklift 10 to measure a weight of a load placed on the work lever 11; and the electronic solenoid valve 150 for controlling the hydraulic motor 130 connected to the work lever 11.

In such a case, the controller 120 may extract only the weight of the load from the weight sensor 140, which simultaneously measures a weight of the work lever 11 and the weight of the load.

In a lowering operation where the load placed on the work lever 11 of the forklift 10 is lowered, the weight sensor 140 measures the weight of the work lever 11 of the forklift 10, converts the weight into a load voltage G, and transmits the load voltage G to the controller 120.

In the controller 120, a table including a maximum current B under a full load condition and a maximum current C under a no-load condition is preset according to the weight of the load placed on the work lever 11. According to the weight of the load measured by the weight sensor 140, the controller 120 determines a maximum current H of the electronic solenoid valve 150 between the current C under the full load condition and the current B under the no-load condition.

Figure 3:
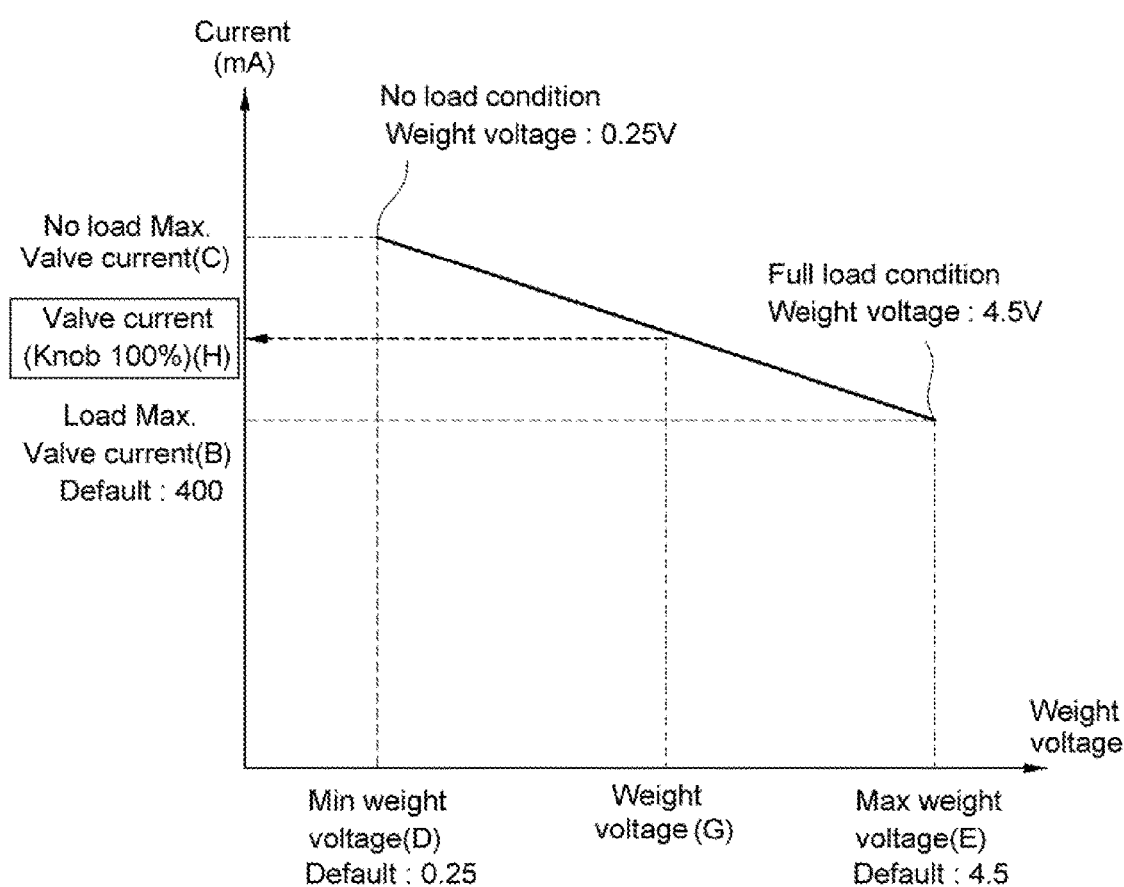
FIG. 3 is a graph illustrating a current map, in a controller, which is preset according to a weight of a load.

FIG. 3 is a graph illustrating a current map, in the controller 120, which is preset according to the weight of the load. In FIG. 3, a horizontal axis represents a voltage converted by the weight sensor 140 according to the weight of the load placed on the work lever 11, and a vertical axis represents a preset current corresponding to the horizontal axis.

Figure 4:
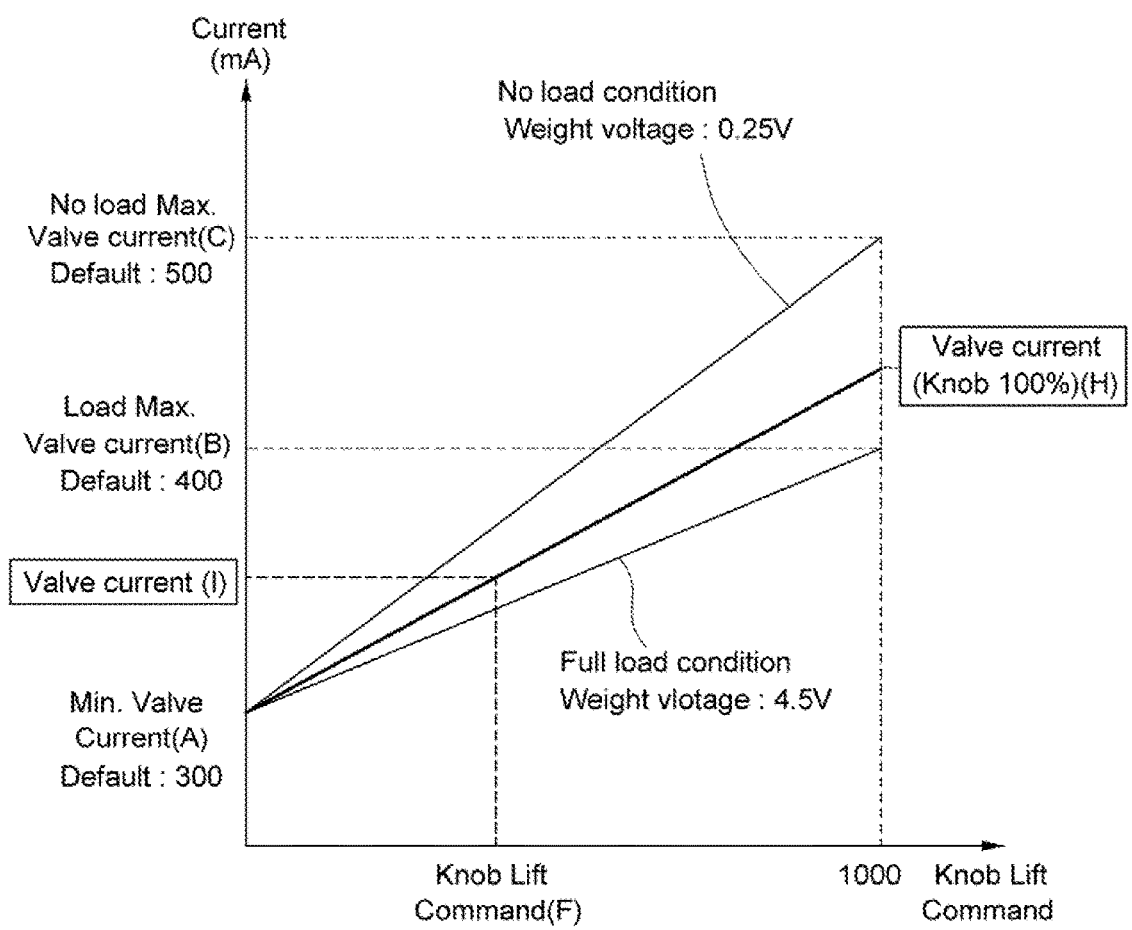
FIG. 4 is a graph illustrating a current change map according to a height of a work lever according to an embodiment of the present disclosure.

FIG. 4 is a graph illustrating a current change map according to a height of the work lever 11 according to an embodiment of the present disclosure. In FIG. 4, a horizontal axis represents a position of the work lever 11, and a vertical axis represents a current applied to the electronic solenoid valve 150. FIG. 4 illustrates a map which illustrates a maximum current B under the full load condition and a maximum current C under the no-load condition, according to the position of the work lever 11. Meanwhile, FIG. 3 illustrates the maximum current B under the full load condition and the maximum current C under the no-load condition when the work lever 11 is at a maximum height in FIG. 4. As will be recognized by those skilled in the art "(Knob 100%)" indicates a correspondence to a maximum height of the work machine operation device 110 so that the maximum current values are provided with respect to a maximum height value of the work machine operation device as illustrated in FIG. 4 with respect to a height value F of 1000.

For example, as illustrated in FIG. 3, when a load of a maximum weight is placed on the work lever 11, a maximum weight voltage E is measured and converted by the weight sensor 140 is 4.5 V, and the maximum current (or a valve current) B under the full load condition corresponding thereto in the table is preset to 400 mA. Similarly, when there is no load on the work lever 11, the minimum weight voltage D is measured and converted by the weight sensor 140 is 0.25 V, and the maximum current (or a valve current) C under the no-load condition corresponding thereto in the table is preset to 500 mA.

For example, as illustrated in FIG. 3, when a load of a maximum weight is placed on the work lever 11, a maximum weight voltage E measured and converted by the weight sensor 140 is 4.5 V, and the maximum current (or a valve current) B under the full load condition corresponding thereto in the table is preset to 400 mA. Similarly, when there is no load on the work lever 11, the maximum weight voltage E measured and converted by the weight sensor 140 is 0.25 V, and the maximum current (or a valve current) C under the no-load condition corresponding thereto in the table is preset to 500 mA.

First, when a load is placed on the work lever 11, the weight sensor 140 transmits, to the controller 120, the load voltage (or weight voltage) G according to the weight of the load, and the controller 120 determines the maximum load current (or a valve current) H of the electronic solenoid valve 150, based on the following Equation 1, by matching the load voltage G in the preset map.

$$H = \frac{(B - C)}{(E - D)} \times (G - D) + C \quad \text{[Equation 1]}$$

B: Maximum current under full load condition
C: Maximum current under no-load condition
D: Minimum weight voltage
E: Maximum weight voltage
G: Load voltage
H: Maximum load current That is, the controller 120 determines the maximum load current H based on [Equation 1] between the maximum current B under the full load condition and the maximum current C under the no-load condition, and the maximum load current H is illustrated in FIG. 3.

Thereafter, as illustrated in FIG. 4, a map according to a height value F in a range of 0 to 1000 that corresponds to the height value of the work machine operation device 110 is preset in the controller 120, and a valve current I is obtained by using the maximum load current H determined in the controller 120. The valve current I has a current value applied to the electronic solenoid valve 150, and in detail, the controller 120 may obtain the valve current I based on the following [Equation 2].

$$I = A + \frac{F}{1000} \times (H - A) \quad \text{[Equation 2]}$$

A: Minimum valve current
D: Minimum weight voltage
F: Height value of the work machine operation device
H: Maximum load current
I: Valve Current FIG. 5 is a graph illustrating a lowering speed of a lever of a forklift according to an embodiment of the present disclosure.

Figure 5:
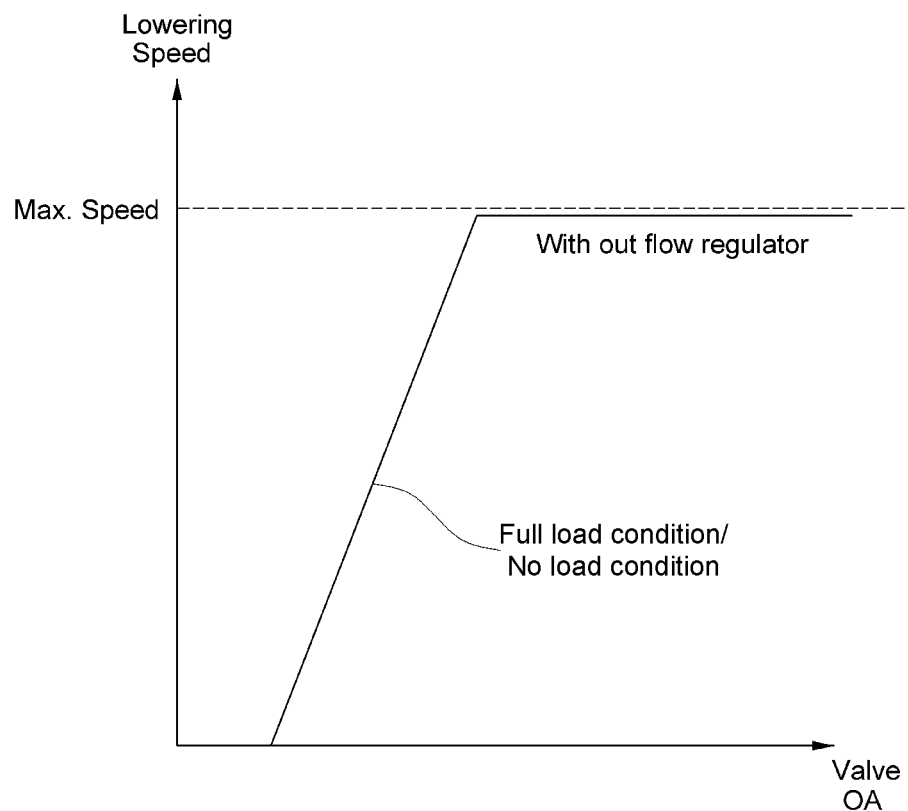
FIG. 5 is a graph illustrating a lowering speed of a lever of a forklift according to an embodiment of the present disclosure.

When the system of controlling a lowering speed of the forklift lever according to an embodiment of the present disclosure is used as illustrated in FIG. 5, even though a flow regulator as in the conventional art is not provided, a constant amount of change in the lowering speed of the work lever 11, with respect to a valve opening area, may be achieved. That is, even if the flow regulator is not provided, a same change in the lowering speed with respect to a valve opening area may be realized at any point between the full load and the no load. Accordingly, the present disclosure may have a certain controllability, thereby increasing the stability of the forklift.

In addition, since the configuration of the conventional forklift may be used as it is, even though no expensive flow regulator is provided, a relatively low cost weight sensor may be used to measure the weight of the load into a voltage signal and then a signal of the electronic solenoid valve may be controlled based on the voltage signal, so as to realize a uniform change in the lowering speed of the work lever 11 with respect to a valve opening area. Accordingly, a certain operability may be provided during the lowering operation of the work lever 11, and the cost may be reduced such that the economic efficiency may be improved.

As set forth hereinabove, in a system of controlling a speed of lowering a forklift lever according to one or more embodiments, although the flow regulator is not provided as in the conventional art, a constant amount of change in the speed of lowering the work lever, with respect to a valve opening area, may be achieved.

That is, although the flow regulator is not provided, a constant amount of change in the lowering speed with respect to a valve opening area may be realized at any point between the full load and the no-load conditions. Accordingly, the present disclosure may have a certain controllability, thereby increasing the stability of the forklift.

The embodiment of a system of controlling a speed of lowering a forklift lever according to the present disclosure described above is merely exemplary, and it will be apparent to those of ordinary skill in the art that various changes in form and detail may be made thereto without departing from the spirit and scope of the present invention. Therefore, it will be understood that the present invention is not limited to the forms or configurations described in the above detailed description. The true technical protection scope of the present invention will be defined by the technical spirit of the appended claims. It is also to be understood that the present invention includes all modifications, equivalents and substitutions within the spirit and scope of the invention as defined by the appended claims.

What is claimed is:

1. A system of controlling a lowering speed of a work lever of a forklift, comprising:
   a hydraulic motor connected to the work lever through a hydraulic line to transmit a power to the work lever;
   an electronic solenoid valve configured to control the hydraulic motor connected to the work lever;
   a weight sensor provided at one side of the work lever, the weight sensor configured to measure a weight of a load placed on the work lever, to convert the weight into a load voltage, and to transmit the load voltage corresponding to a measured value to a controller; and
   a controller configured to control an RPM of the hydraulic motor and to control a current amount applied to the electronic solenoid valve based on a maximum current determined with respect to the measured value transmitted from the weight sensor, such that a rate of change in a lowering speed of the work lever is unaffected by the weight of the load placed on the work lever, wherein the controller includes a preset table in which is stored a maximum current under a full load condition and a maximum current under a no-load condition that represent the determined maximum current for those respective conditions, and wherein the controller is configured to determine the maximum current where the work lever has a load less than a full load, between the maximum current under the full load condition and the maximum current under the no-load condition, according to the load voltage transmitted by the weight sensor.

2. The system of claim 1, wherein the controller determines the maximum load current of the electronic solenoid valve based on the load voltage and the following equation:

$$H = \frac{(B-C)}{(E-D)} \times (G-D) + C$$

where: B is the maximum current under full load condition, C is the maximum current under no-load condition, D is a minimum weight voltage, E is a maximum weight voltage, G is the load voltage, and H is the determined maximum load current.

3. The system of claim 2, wherein a table according to a height of a work machine operation device is preset in the controller, and the controller determines a valve current applied to the electronic solenoid valve, based on the determined maximum load current.

4. The system of claim 3, wherein the controller determines the valve current based on the following equation:

$$I = A + \frac{F}{1000} \times (H - A)$$

where A is the minimum current, D is the minimum weight voltage, F is a height value in a range of 0-1000 corresponding to the height of the work machine operation device, H is the determined maximum load current, and I is the valve current.

* * * * *